US009430410B2

(12) United States Patent
Avudaiyappan et al.

(10) Patent No.: US 9,430,410 B2
(45) Date of Patent: Aug. 30, 2016

(54) SYSTEMS AND METHODS FOR SUPPORTING A PLURALITY OF LOAD ACCESSES OF A CACHE IN A SINGLE CYCLE

(75) Inventors: Karthikeyan Avudaiyappan, Sunnyvale, CA (US); Mohammad Abdallah, San Jose, CA (US)

(73) Assignee: SOFT MACHINES, INC., Santa Clara, CA (US)

( * ) Notice: Subject to any disclaimer, the term of this patent is extended or adjusted under 35 U.S.C. 154(b) by 119 days.

(21) Appl. No.: 13/561,528

(22) Filed: Jul. 30, 2012

(65) Prior Publication Data
US 2014/0032845 A1 Jan. 30, 2014

(51) Int. Cl.
*G06F 12/08* (2006.01)
*G06F 12/14* (2006.01)

(52) U.S. Cl.
CPC ....... *G06F 12/1458* (2013.01); *G06F 12/0846* (2013.01); *G06F 12/0897* (2013.01); *G06F 2212/1052* (2013.01); *G06F 2212/221* (2013.01); *G06F 2212/62* (2013.01)

(58) Field of Classification Search
CPC .................. G06F 12/0846; G06F 12/0844
See application file for complete search history.

(56) References Cited

U.S. PATENT DOCUMENTS

| 4,075,704 | A | 2/1978 | O'Leary |
| 4,245,344 | A | 1/1981 | Richter |
| 4,356,550 | A | 10/1982 | Katzman et al. |
| 4,414,624 | A | 11/1983 | Summer, Jr. et al. |
| 4,524,415 | A | 6/1985 | Mills, Jr. et al. |
| 4,527,237 | A | 7/1985 | Frieder et al. |
| 4,577,273 | A | 3/1986 | Hoppert et al. |
| 4,597,061 | A | 6/1986 | Cline et al. |
| 4,600,986 | A | 7/1986 | Scheuneman et al. |
| 4,633,434 | A | 12/1986 | Scheuneman |
| 4,682,281 | A | 7/1987 | Woffinden et al. |
| 4,816,991 | A | 3/1989 | Watanabe et al. |
| 4,920,477 | A | 4/1990 | Colwell et al. |
| 5,294,897 | A | 3/1994 | Notani et al. |
| 5,317,705 | A | 5/1994 | Gannon et al. |
| 5,317,754 | A | 5/1994 | Blandy et al. |
| 5,548,742 | A | 8/1996 | Wang et al. |
| 5,559,986 | A * | 9/1996 | Alpert et al. ................. 711/144 |
| 5,574,878 | A | 11/1996 | Onodera et al. |

(Continued)

FOREIGN PATENT DOCUMENTS

| EP | 0596636 | 5/1994 |
| EP | 0706133 | 4/1996 |
| WO | 0125921 | 4/2001 |

OTHER PUBLICATIONS

Barham et al., "Xen and the Art of Virtualization," ACM; Oct. 19, 2003; pp. 164-177.

(Continued)

*Primary Examiner* — Michael Krofcheck (57) ABSTRACT

A method for supporting a plurality of load accesses is disclosed. A plurality of requests to access a data cache is accessed, and in response, a tag memory is accessed that maintains a plurality of copies of tags for each entry in the data cache. Tags are identified that correspond to individual requests. The data cache is accessed based on the tags that correspond to the individual requests. A plurality of requests to access the same block of the plurality of blocks causes an access arbitration that is executed in the same clock cycle as is the access of the tag memory.

20 Claims, 7 Drawing Sheets

(56) References Cited

U.S. PATENT DOCUMENTS

| | | | |
|---|---|---|---|
| 5,634,068 A * | 5/1997 | Nishtala et al. | 711/141 |
| 5,752,260 A * | 5/1998 | Liu | 711/129 |
| 5,754,818 A | 5/1998 | Mohamed | |
| 5,787,494 A | 7/1998 | DeLano et al. | |
| 5,793,941 A | 8/1998 | Pencis et al. | |
| 5,802,602 A | 9/1998 | Rahman et al. | |
| 5,806,085 A * | 9/1998 | Berliner | 711/113 |
| 5,813,031 A | 9/1998 | Chou et al. | |
| 5,835,951 A | 11/1998 | McMahan | |
| 5,852,738 A | 12/1998 | Beakowski et al. | |
| 5,860,146 A | 1/1999 | Vishin et al. | |
| 5,864,657 A | 1/1999 | Stiffler | |
| 5,872,985 A | 2/1999 | Kimura | |
| 5,905,509 A | 5/1999 | Jones et al. | |
| 5,918,251 A | 6/1999 | Yamada et al. | |
| 5,956,753 A | 9/1999 | Glew et al. | |
| 5,974,506 A | 10/1999 | Sicola et al. | |
| 6,016,533 A | 1/2000 | Tran | |
| 6,073,230 A | 6/2000 | Pickett et al. | |
| 6,075,938 A | 6/2000 | Bugnion et al. | |
| 6,088,780 A | 7/2000 | Yamada et al. | |
| 6,092,172 A | 7/2000 | Nishimoto et al. | |
| 6,101,577 A | 8/2000 | Tran | |
| 6,134,634 A | 10/2000 | Marshall, Jr. et al. | |
| 6,138,226 A | 10/2000 | Yoshioka et al. | |
| 6,167,490 A | 12/2000 | Levy et al. | |
| 6,212,613 B1 | 4/2001 | Belair | |
| 6,226,732 B1 | 5/2001 | Pei et al. | |
| 6,260,131 B1 | 7/2001 | Kikuta et al. | |
| 6,272,662 B1 | 8/2001 | Jadav et al. | |
| 6,275,917 B1 | 8/2001 | Okada | |
| 6,321,298 B1 | 11/2001 | Hubis | |
| 6,341,324 B1 | 1/2002 | Caulk, Jr. et al. | |
| 6,437,789 B1 | 8/2002 | Tidwell et al. | |
| 6,449,671 B1 | 9/2002 | Patkar et al. | |
| 6,557,083 B1 | 4/2003 | Sperber et al. | |
| 6,604,187 B1 | 8/2003 | McGrath et al. | |
| 6,658,549 B2 | 12/2003 | Wilson et al. | |
| 6,681,395 B1 | 1/2004 | Nishi | |
| 6,907,600 B2 | 6/2005 | Neiger et al. | |
| 6,912,644 B1 | 6/2005 | O'Connor et al. | |
| 7,007,108 B2 | 2/2006 | Emerson et al. | |
| 7,111,145 B1 | 9/2006 | Chen et al. | |
| 7,149,872 B2 | 12/2006 | Rozas et al. | |
| 7,213,106 B1 | 5/2007 | Koster et al. | |
| 7,278,030 B1 | 10/2007 | Chen et al. | |
| 7,380,096 B1 | 5/2008 | Rozas et al. | |
| 7,406,581 B2 | 7/2008 | Southwell | |
| 7,546,420 B1 | 6/2009 | Shar et al. | |
| 7,856,530 B1 | 12/2010 | Mu | |
| 7,913,058 B2 | 3/2011 | Rozas et al. | |
| 8,145,844 B2 | 3/2012 | Bruce | |
| 8,239,656 B2 | 8/2012 | Rozas et al. | |
| 8,301,847 B2 | 10/2012 | Dantzig et al. | |
| 8,522,253 B1 | 8/2013 | Rozas et al. | |
| 8,868,838 B1 | 10/2014 | Glasco et al. | |
| 8,930,674 B2 | 1/2015 | Avudaiyappan et al. | |
| 9,047,178 B2 | 6/2015 | Talagala et al. | |
| 2002/0069326 A1 | 6/2002 | Richardson et al. | |
| 2002/0082824 A1 | 6/2002 | Neiger et al. | |
| 2002/0099913 A1 | 7/2002 | Steely, Jr. | |
| 2003/0088752 A1 | 5/2003 | Harman | |
| 2004/0044850 A1 | 3/2004 | George et al. | |
| 2004/0064668 A1 | 4/2004 | Kjos et al. | |
| 2004/0117593 A1 | 6/2004 | Uhlig et al. | |
| 2004/0117594 A1 | 6/2004 | VanderSpek | |
| 2004/0205296 A1 | 10/2004 | Bearden | |
| 2004/0215886 A1 | 10/2004 | Cargnoni et al. | |
| 2005/0027961 A1 | 2/2005 | Zhang | |
| 2005/0060457 A1 | 3/2005 | Olukotun | |
| 2005/0108480 A1 | 5/2005 | Correale, Jr. et al. | |
| 2005/0154867 A1 | 7/2005 | DeWitt et al. | |
| 2006/0026381 A1 | 2/2006 | Doi et al. | |
| 2006/0236074 A1 | 10/2006 | Williamson et al. | |
| 2006/0277365 A1 | 12/2006 | Pong | |
| 2008/0077813 A1 | 3/2008 | Keller et al. | |
| 2008/0091880 A1 | 4/2008 | Vishin | |
| 2008/0126771 A1 | 5/2008 | Chen et al. | |
| 2008/0215865 A1 | 9/2008 | Hino et al. | |
| 2008/0270758 A1 | 10/2008 | Ozer et al. | |
| 2008/0282037 A1 | 11/2008 | Kusachi et al. | |
| 2009/0138659 A1 | 5/2009 | Lauterbach | |
| 2009/0157980 A1 | 6/2009 | Bruce | |
| 2009/0164733 A1 | 6/2009 | Kim et al. | |
| 2009/0172344 A1 | 7/2009 | Grochowski et al. | |
| 2010/0138607 A1 | 6/2010 | Hughes et al. | |
| 2010/0169578 A1 * | 7/2010 | Nychka et al. | 711/138 |
| 2010/0211746 A1 | 8/2010 | Tsukishiro | |
| 2011/0010521 A1 | 1/2011 | Wang et al. | |
| 2011/0082983 A1 | 4/2011 | Koktan | |
| 2011/0153955 A1 | 6/2011 | Herrenschmidt et al. | |
| 2012/0042126 A1 | 2/2012 | Krick et al. | |
| 2013/0019047 A1 | 1/2013 | Podvalny et al. | |
| 2013/0046934 A1 * | 2/2013 | Nychka et al. | 711/119 |
| 2013/0086417 A1 | 4/2013 | Sivaramakrishnan et al. | |
| 2013/0097369 A1 | 4/2013 | Talagala et al. | |
| 2013/0238874 A1 | 9/2013 | Avudaiyappan et al. | |
| 2013/0346699 A1 | 12/2013 | Walker | |
| 2014/0032844 A1 | 1/2014 | Avudaiyappan et al. | |
| 2014/0032845 A1 | 1/2014 | Avudaiyappan et al. | |
| 2014/0032856 A1 | 1/2014 | Avudaiyappan et al. | |
| 2014/0108730 A1 | 4/2014 | Avudaiyappan et al. | |
| 2014/0156947 A1 | 6/2014 | Avudaiyappan et al. | |
| 2014/0281242 A1 | 9/2014 | Abdallah et al. | |
| 2016/0041908 A1 | 2/2016 | Avudaiyappan et al. | |
| 2016/0041913 A1 | 2/2016 | Avudaiyappan et al. | |
| 2016/0041930 A1 | 2/2016 | Avudaiyappan et al. | |

OTHER PUBLICATIONS

Gene Cooperman, Cache Basics, 2003, http://www.ccs.neu.edu/course/com3200/parent/Notes/cache-basics.html, pp. 1-3.

* cited by examiner

SYSTEMS AND METHODS FOR SUPPORTING A PLURALITY OF LOAD ACCESSES OF A CACHE IN A SINGLE CYCLE

A cache in a central processing unit is a data storage structure that is used by the central processing unit of a computer to reduce the average time that it takes to access memory. It is a memory which stores copies of data that is located in the most frequently used main memory locations. Moreover, cache memory is memory that is smaller and that may be accessed more quickly than main memory. There are several different types of caches. These include physically indexed physically tagged (PIPT), virtually indexed virtually tagged (VIVT) and virtually indexed physically tagged (VIPT).

Caches that can accommodate multiple accesses in a single cycle provide performance advantages. In particular, such caches feature reduced access latencies. Conventional approaches to accommodating multiple accesses in a single cycle include the use of multi-ported caches and the provision of caches that include a plurality of tag and data banks.

A multi-ported cache is a cache which can serve more than one request at a time. In accessing some conventional caches a single memory address is requested, whereas in a multi-ported cache, N memory addresses can be requested at a time, where N is the number of ports that is possessed by the multi-ported cache. An advantage of a multi ported cache is that greater throughput (e.g., a greater number of load and store requests) may be accommodated. However, the number of cache ports that are needed to accommodate increasingly high levels of throughput may not be practical.

Caches that include a plurality of tag and data banks can serve more than one request at a time as each tag and data bank can serve at least one request. However, when more than one request attempts to access the same bank, the request that will be allowed to access the bank must be determined. In one conventional approach arbitration is used to determine which request will be allowed to access a given tag and data bank. In such conventional approaches, the time that it takes to execute the arbitration can delay access to the tag bank and thus delay the triggering of the critical Load Hit signal, typically found in the level 1 cache of processors.

SUMMARY

Conventional approaches to accommodating throughput that involve multiple loads can result in unsatisfactory delays in receiving load hit signals. A method for supporting a plurality of load accesses of a data cache (e.g., formed from SRAM or other type memory) is disclosed that addresses these shortcomings. However, the claimed embodiments are not limited to implementations that address any or all of the aforementioned shortcomings. As a part of the method, a plurality of requests to access the data cache is accessed, and in response, a tag memory is accessed that maintains a plurality of copies of tags for each entry in the data cache. Tags are identified that correspond to individual requests. The data cache (e.g., formed from SRAM or other type memory) is divided into many banks or "blocks". The data cache is accessed based on the identified tags. A plurality of requests to access the same block of the plurality of blocks of the data cache results in an access arbitration with respect to that block. The block access arbitration is executed in parallel with the access of tags that correspond to individual access requests. Consequently, the penalty to the timing of load hit signals that is exacted by arbitration to access tag and data banks found in conventional approaches is avoided.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "searching" or "identifying" or "providing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 1A:
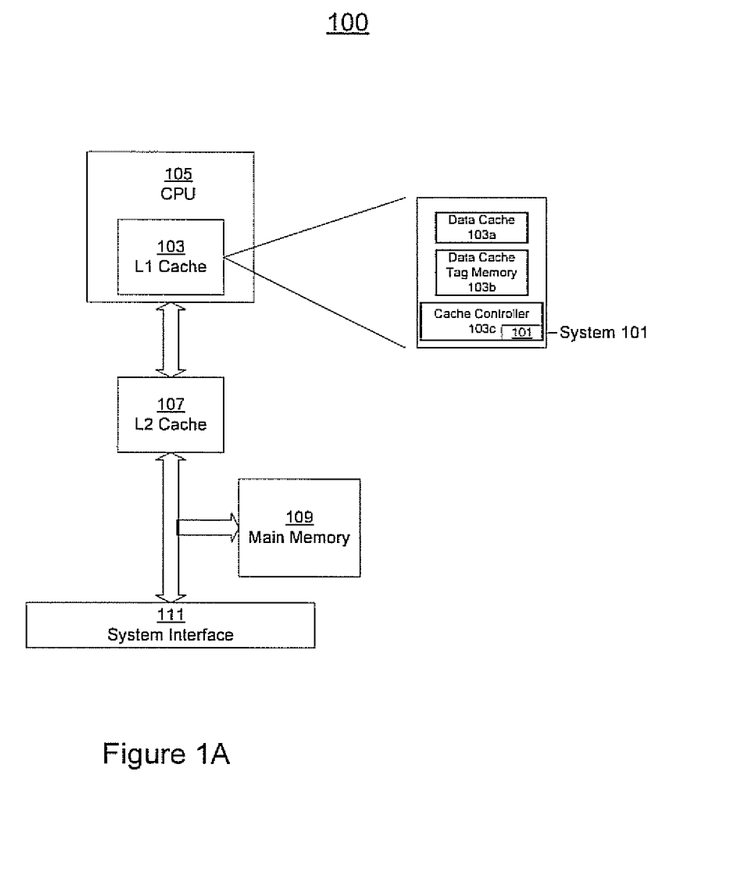
FIG. 1A shows an exemplary operating environment of a system for supporting a plurality of load accesses of a data cache in a single cycle according to one embodiment.

Exemplary Operating Environment of a System for Supporting a Plurality of Load Accesses of a Cache in a Single Cycle According to One Embodiment FIG. 1A shows an exemplary operating environment 100 for supporting a plurality of load accesses of a data cache in a single clock cycle according to one embodiment. System 101 enables tags corresponding to data sought by a plurality of load requests to a level one data cache (that has a plurality of data blocks to accommodate the plurality of requests) to be obtained within a single clock cycle. Moreover, as a part of the operation of system 101, block access arbitrations involving the plurality of load requests to the level one data cache are executed within the same clock cycle. Consequently, a throughput of a plurality of load accesses is accommodated and the penalty to the timing of load hit signals that is exacted by arbitration in conventional approaches is avoided. FIG. 1A shows system 101, level one (L1) cache 103, level one (L1) data cache 103a, data cache tag memory 103b, L1 cache controller 103c, CPU 105, level two (L2) cache 107, main memory 109 and system interface 111.

Figure 1B:
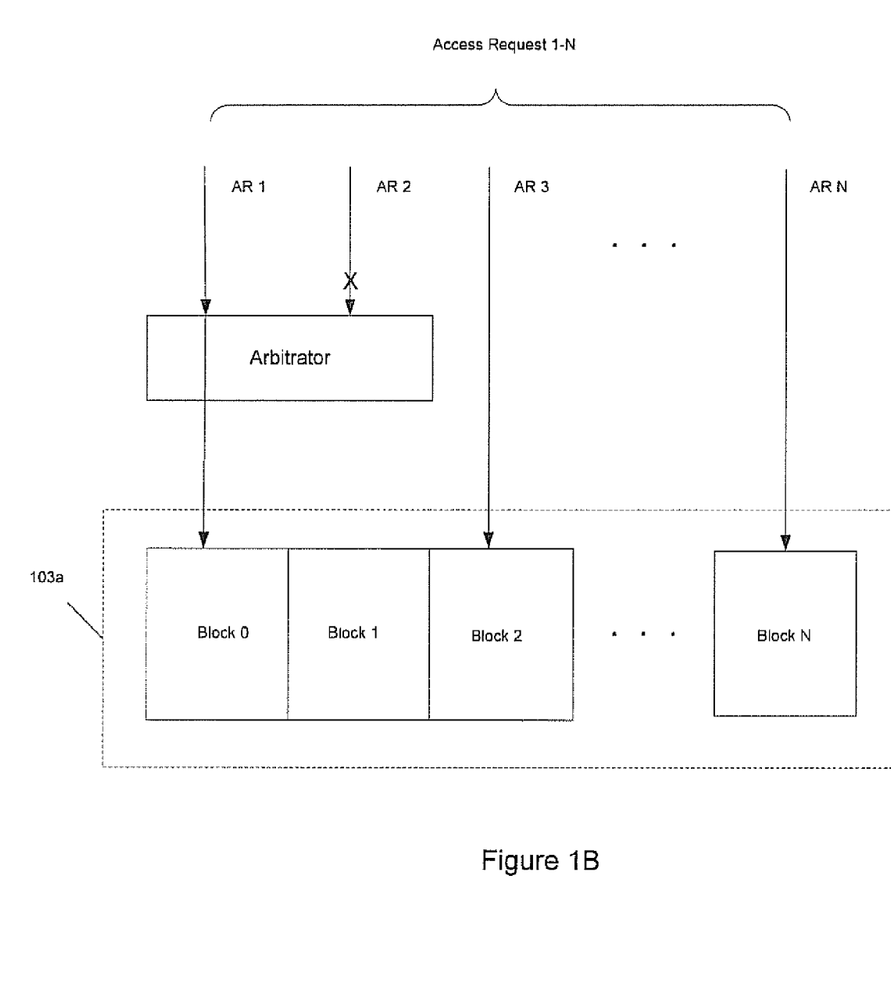
FIG. 1B shows the manner in which a plurality of data blocks facilitate the accessing of a data cache by a throughput of multiple load accesses in the same clock cycle according to one embodiment.

Referring to FIG. 1A, L1 cache 103 is a level 1 or "primary" cache and L2 cache 107 is a level 2 or "secondary" cache. In one embodiment, L1 cache 103 can be formed as a part of CPU 105. In one embodiment, as is shown in FIG. 1A, L1 cache 103 can include L1 data cache 103a, data cache tag memory 103b and L1 cache controller 103c. In one embodiment, L1 data cache 103a can be divided into a plurality of data blocks. In one embodiment, L1 data cache 103a can be divided into four 8 kilobyte data blocks. In other embodiments, L1 data cache 103a can be divided into other numbers of data blocks that have the capacity to store other amounts of data. In one embodiment, as shown in FIG. 1B, the plurality of data blocks facilitate the accessing of L1 data cache 103a by a throughput of multiple accesses in the same clock cycle. In one embodiment, conflicting requests for access that seek to access the same block of L1 data cache 103a at the same time can be resolved using arbitration (whose time impact as discussed above is negated). In one embodiment, the data blocks can include cache line entries that are accessed by loads.

Figure 1C:
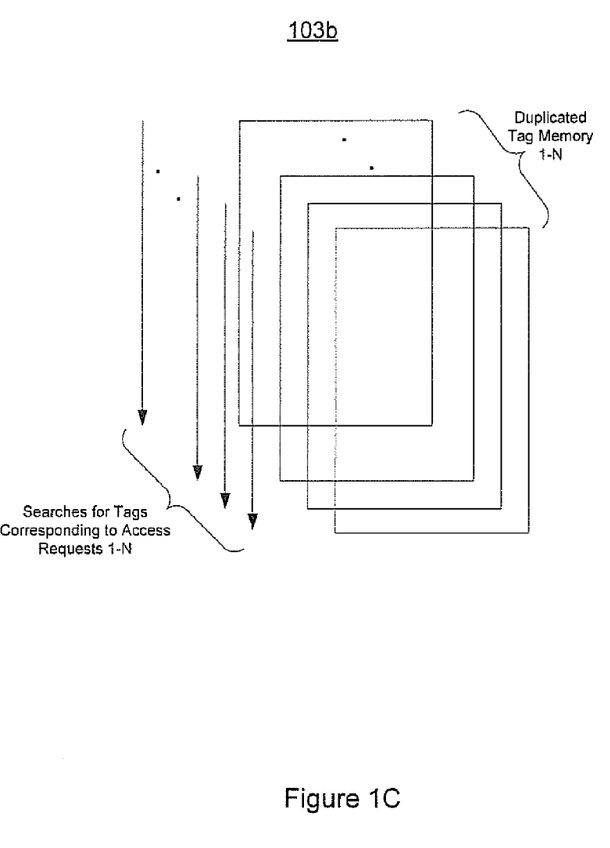
FIG. 1C shows a data cache tag memory that maintains a plurality of copies of the tags that correspond to the entries of a level one data cache according to one embodiment.

Data cache tag memory 103b is configured to maintain tag entries for each of the cache line entries stored in L1 data cache 103a. Referring to FIG. 1C, in one embodiment, as a part of the aforementioned configuration, data cache tag memory 103b maintains a plurality of copies (e.g., 1-N) of the tags that correspond to the entries of L1 data cache 103a. In particular, each request to access L1 data cache 103a is accorded a dedicated copy of tags corresponding to the entries of L1 data cache 103a. This manner of maintaining tag entries facilitates the identification of tags that are associated with the cache line entries within a single clock cycle. In one embodiment, an identification of a tag can be completed in the same clock cycle in which an arbitration involving an access request (e.g., load request) to L1 data cache 103a for data associated with the tag is executed. In one embodiment, access requests (e.g., load requests) to L1 data cache 103a trigger a search of data cache tag memory 103b for the tag that corresponds to the data that is sought by the load request.

Figure 1D:
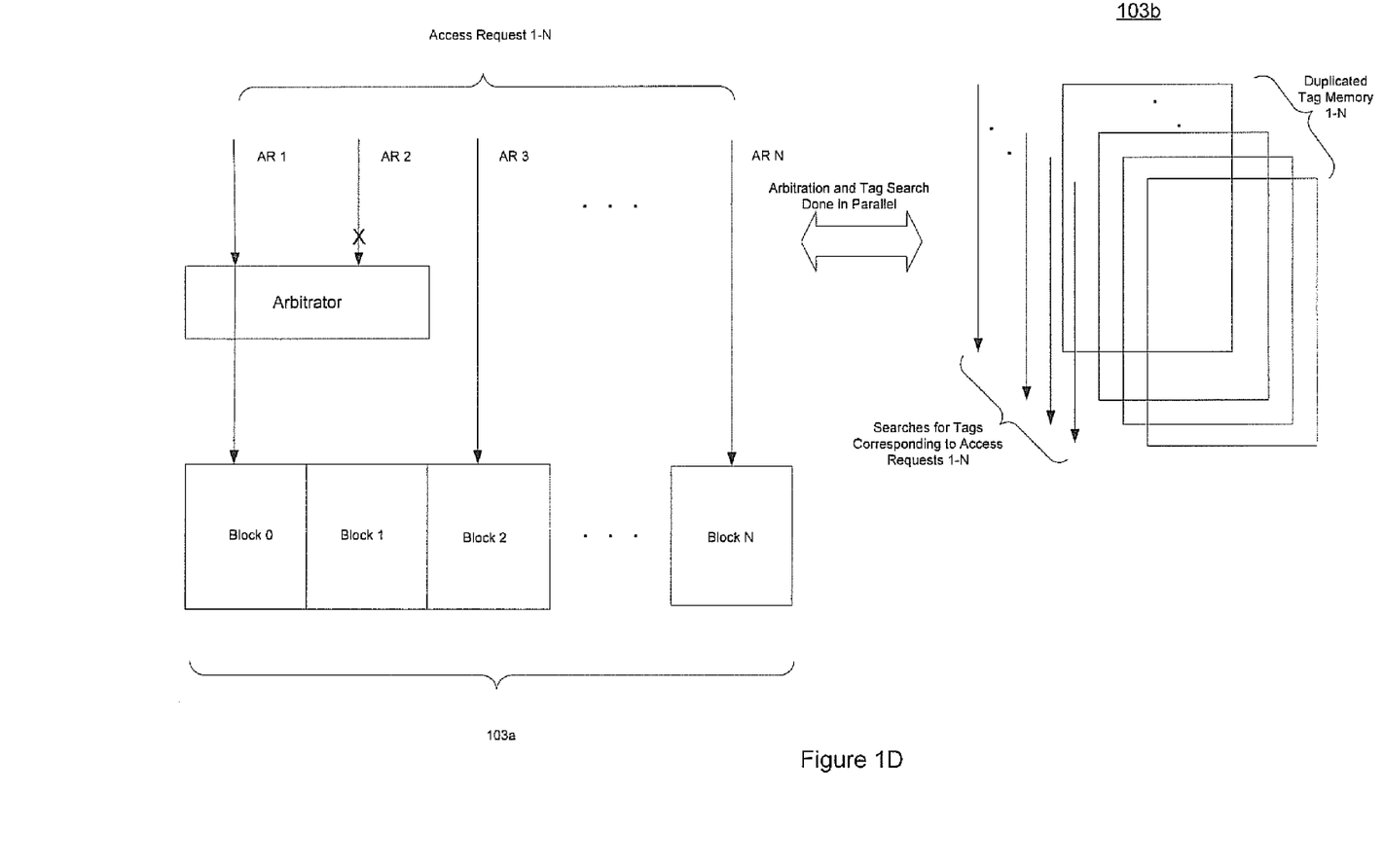
FIG. 1D illustrates arbitration operations associated with a first access request and a second access request of access requests 1-N being executed in parallel with a search of a data cache tag memory according to one embodiment.

Referring to FIG. 1A, system 101, responsive to a receipt by L1 cache 103 of a plurality of request to access L1 data cache 103a of L1 cache 103, executes a search of a data cache tag memory 103b such that tags that correspond to data sought by the plurality of requests are identified in parallel with the execution of any arbitration operations that are associated with the requests. This is illustrated in FIG. 1D, where arbitration operations associated with a first access request AR1 and a second access request AR2 of access requests 1-N, are shown as being executed in parallel with a search of data cache tag memory 103b. In one embodiment, the aforementioned action of system 101 operates to avoid a deleterious impact of arbitration operations on the timing of load hit signals. In particular, system 101, supported by duplicated data cache tag memory 103b and blocked L1 data cache 103a, facilitates the access of a cache by several load requests in one clock cycle without penalizing cache hit latency and throughput. In one embodiment, system 101 can be located in cache controller 103c. In other embodiments, system 101 can be separate from cache controller 103c, but operate cooperatively therewith.

Referring again to FIG. 1A, main memory 111 includes physical addresses that store the information that is copied into cache memory. In one embodiment, when the information that is contained in the physical addresses of main memory that have been cached is changed, the corresponding cached information is updated to reflect the changes made to the information stored in main memory. Also shown in FIG. 1A is system interface 111.

Operation

Figure 1E:
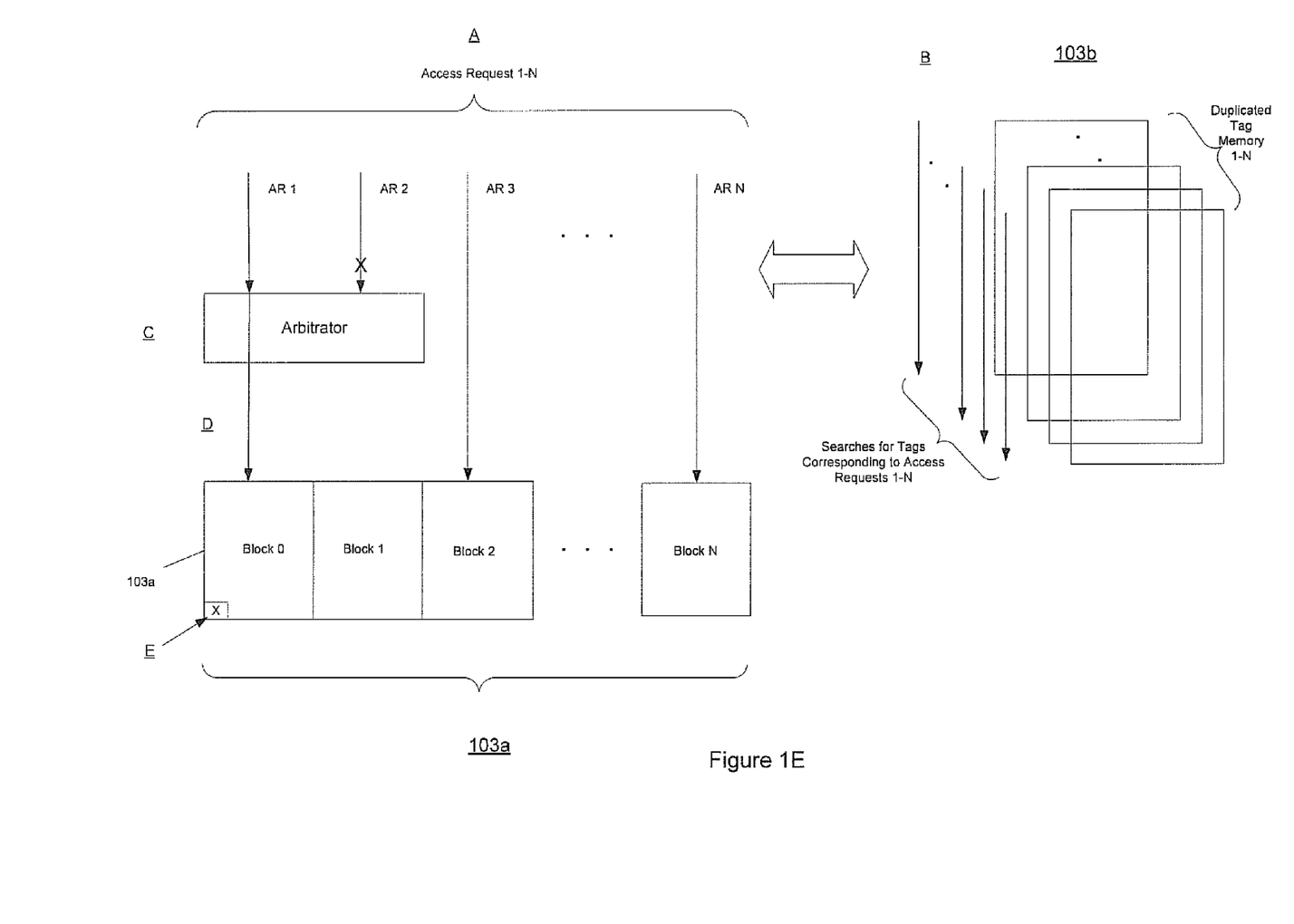
FIG. 1E illustrates the operations that are performed by a system for supporting a plurality of load accesses of a data cache in a single cycle according to one embodiment.

FIG. 1E illustrates operations performed by system 101 for supporting a plurality of load accesses of a data cache in a single cycle according to one embodiment. These operations, which relate to supporting a plurality of load accesses to a data cache are illustrated for purposes of clarity and brevity. It should be appreciated that other operations not illustrated by FIG. 1E can be performed in accordance with one embodiment.

Referring to FIG. 1E, at A, a plurality of requests to access data cache 103a are received. In the FIG. 1E example, two of the plurality of requests, access request AR1 and access request AR2, attempt to access the same data block (for example block 0 as identified by virtual address bits 6 and 7 of AR1 and AR2, e.g., virtual address bits 7:6 of the virtual address associated with AR1 and AR2) of L1 data cache 103a are received.

At B, data cache tag memory 103b is searched and tags residing therein that are associated with the data sought by the plurality of requests (AR1-ARN) to access L1 data cache 103a are identified.

At C, during the same clock cycle as the search of data cache tag memory 103b that is executed at B, an arbitration process to determine which of the two requests (access request AR1 and access request AR2) will be allowed to access block 0 of L1 data cache 103a is initiated and completed. As a part of the aforementioned arbitration process, one of the two requests (access request AR1) is chosen to proceed with access of block 0.

At D, the plurality of access requests (except those that are arbitration losers such as AR2 in the FIG. 1E example) access data cache 103a using the tags that are identified at B.

At E, the data (for example "X" corresponding to AR1) that is sought by the access requests are identified in L1 data cache 103a and read (e.g., loaded).

In one embodiment, system 101 is designed to operate in environments where several load and store instructions are provided in a single cycle. In one embodiment, the methodology disclosed herein avoids the reliance upon the use of an excessive number of cache ports, which may not be practical. In exemplary embodiments, throughput is enabled without negatively impacting the timing of the "Load Hit" signal.

In one embodiment, as discussed herein, L1 data cache 103a can be organized into a plurality of blocks and the tags that correspond to data that is maintained in L1 data cache 103a can be duplicated and stored in data cache tag memory 103b. Moreover, as discussed herein, the organization of data cache 103a into blocks enable several loads to be supported in a single cycle if they do not access the same data block. However, in one embodiment, multiple loads to a single data block can be accommodated as long as they are to the same address. In exemplary embodiments, the approach discussed herein does not perform any arbitration with regard to tags and thus avoids a latency penalty (the addition of latency) related to the timing of a "Load Hit" signal that would derive from such arbitration operations.

Figure 2:
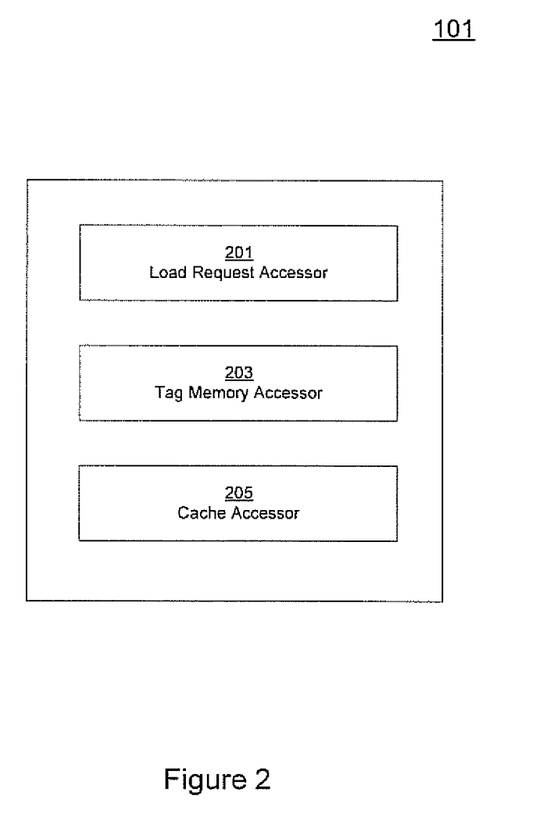
FIG. 2 shows components of a system for supporting a plurality of load accesses of a data cache in a single cycle according to one embodiment.

Components of System for Supporting a Plurality of Load Accesses of a Cache in a Single Cycle According to One Embodiment FIG. 2 shows components of a system 101 for supporting a plurality of load accesses of a cache in a single cycle according to one embodiment. In one embodiment, components of system 101 implement an algorithm for supporting a plurality of load accesses. In the FIG. 2 embodiment, components of system 101 include load request accessor 201, tag memory accessor 203 and cache accessor 205.

Load request accessor 201 accesses a plurality of load requests that seek to access data stored in an L1 data cache (e.g., 103a in FIG. 1A). In one embodiment, in some cases, more than one load request of the plurality of load requests can seek to access the same data block in the L1 data cache. In such cases, an arbitration is executed to decide which of the load requests will be allowed to access that block of the L1 data cache.

Tag memory accessor 203, in response to the receipt of a plurality of load requests, searches in parallel, respective copies (e.g., 1-N) of the tags of a data cache tag memory (e.g., 103b in FIG. 1A) that correspond to the entries of an L1 data cache (e.g., 103a of FIG. 1A). In one embodiment, each load request is accorded a dedicated copy of tags that correspond to the entries of the L1 data cache. This manner of maintaining tag entries facilitates the identification of tags that are associated with the cache line entries within a single clock cycle. In one embodiment, an arbitration involving an access request (e.g., load request) to a block of the L1 data cache for data associated with a tag is executed within the same clock cycle in which an identification of the tag is completed.

Cache accessor 205 accesses a plurality of data blocks of the L1 data cache using the tags that are identified by tag memory accessor 203. In one embodiment, the plurality of data blocks facilitates the accessing of the L1 data cache (e.g. 103a in FIG. 1A) by multiple access requestors in the same clock cycle. In one embodiment, conflicting requests for access that seek to access the same block of the L1 data cache at the same time can be resolved using arbitration (whose time impact on the "Load Hit" signal, as discussed herein, is negated by the operation of system 101). In one embodiment, the accesses to the data blocks involve a loading of data.

It should be appreciated that the aforementioned components of system 101 can be implemented in hardware or software or in a combination of both. In one embodiment, components and operations of system 101 can be encompassed by components and operations of one or more computer components or programs (e.g., cache controller 103c in FIG. 1A). In another embodiment, components and operations of system 101 can be separate from the aforementioned one or more computer components or programs but can operate cooperatively with components and operations thereof.

Figure 3:
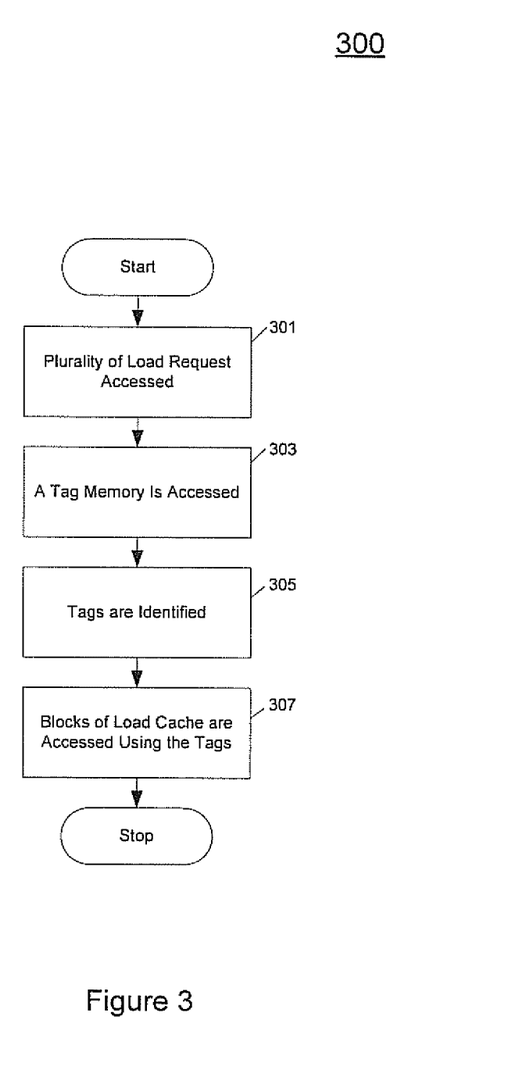
FIG. 3 shows a flowchart of a method for supporting a plurality of load accesses of a data cache in a single cycle according to one embodiment.

Method for Supporting a Plurality of Load Accesses of a Cache in a Single Cycle According to One Embodiment FIG. 3 shows a flowchart 300 of a method for supporting a plurality of load accesses of a data cache in a single cycle according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301 a plurality of load requests to access a data cache are accessed. In one embodiment, the data cache can include a plurality of blocks that can accommodate the plurality of load requests. In one embodiment, the plurality of load requests can include a plurality of requests that seek to access the same block of the aforementioned data cache.

At 303, a tag memory is accessed that maintains a plurality of copies of the tags that correspond to the entries of the data cache.

At 305, tags are identified that correspond to individual load requests of the plurality of load requests received by the L1 cache. In one embodiment, each load request is accorded a dedicated copy of the set of tags that correspond to the entries located in the data cache.

At 307, the blocks of the data cache are accessed based on the tags that are identified as corresponding to the individual requests. In one embodiment, the accessing of the plurality of blocks enables a throughput of multiple load accesses in the same clock cycle.

With regard to exemplary embodiments thereof, systems and methods for accessing a data cache is disclosed. A plurality of requests to access the data cache is accessed, and in response, a tag memory is accessed that maintains a plurality of copies of tags for each entry in the load cache. Tags are identified that correspond to individual requests. The data cache is accessed based on the tags that correspond to the individual requests. A plurality of requests to access the same block of the plurality of blocks causes an access arbitration that is executed in the same clock cycle as is the access of the tag memory.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

We claim:

1. A method for supporting a plurality of accesses of a data cache, comprising:
   accessing a plurality of requests to access said data cache, wherein said data cache comprises a plurality of blocks;
   responsive to said plurality of requests to access said data cache, accessing a tag memory that maintains a plurality of copies of tags for each entry in said data cache and identifying tags that correspond to individual requests of said plurality of requests; and
   accessing said data cache based on said tags that correspond to said individual requests, wherein a plurality of requests to access a same block of said plurality of blocks causes an access arbitration that is executed in the same clock cycle as said accessing said tag memory and that determines, based on said requests to access said same block and without considering whether access to particular lines of said same block are requested, which of said individual requests is granted.

2. The method of claim 1 wherein said accessing said data cache based on said tags comprises a plurality of loads that are executed in a single clock cycle.

3. The method of claim 1 wherein each request of said plurality of requests to access said data cache has a dedicated copy of tags that correspond to entries located in said data cache.

4. The method of claim 1 wherein a plurality of said requests to access said data cache seek to access respective blocks.

5. The method of claim 1 wherein a plurality of said plurality of requests to access said data cache seek access to different addresses within a same block of said data cache in the same cycle.

6. The method of claim 1 wherein said plurality of blocks comprise respective parts of a level one data cache and contain cache line entries.

7. The method of claim 1 wherein said tag memory comprises a tag SRAM.

8. A cache system, comprising:
   a data cache divided into a plurality of data blocks;
   tag memory configured to maintain tags that correspond to a plurality of copies of tags that correspond to entries of said data cache; and
   a cache subsystem configured to access said tag memory and said data cache wherein arbitration operations related to a plurality of requests to access said data cache are executed in the same clock cycle as accesses of said tag memory wherein said arbitration operations determine, based on said requests to access a same block of said data cache, and without considering whether access to particular lines of said same block are requested which of said individual requests is granted.

9. The cache system of claim 8 wherein said plurality of data blocks accommodate a plurality of loads that are executed within a single clock cycle.

10. The cache system of claim 8 wherein a plurality of said plurality of requests to access said data cache seek to access respective data blocks.

11. The cache system of claim 8 wherein each request of said plurality of requests has a dedicated copy of tags that correspond to cache line entries located in said data cache.

12. The cache system of claim 8 wherein said data cache is divided into four 8 kilobyte data blocks.

13. The cache system of claim 8 wherein a plurality of load requests access the same block at different addresses in the same cycle.

14. The cache system of claim 8 wherein said tag memory comprises a tag SRAM.

15. A computer system, comprising:
   a memory;
   a processor; and
   a cache system, comprising:
   a data cache configured to store units of data;
   a tag memory configured to store tags that correspond to said units of data; and
   a cache controller comprising a system for supporting a plurality of accesses to said data cache, comprising:
   a request accessing component for accessing a plurality of requests to access said data cache, wherein said data cache comprises a plurality of blocks;
   a tag memory accessing component for accessing a tag memory that maintains a plurality of copies of tags for each entry in said data cache and identifying tags that correspond to individual requests of said plurality of requests;
   and a data cache accessing component for accessing said data cache based on said tags that correspond to said individual requests, wherein a plurality of requests to access a same block of said plurality of blocks causes an access arbitration that is executed in the same clock cycle as said accessing said tag memory wherein said access arbitration determines, based on said requests to access said same block, and without considering whether access to particular lines of said same block are requested which of said individual requests is granted.

16. The computer system of claim 15 wherein said accessing said data cache comprises a plurality of loads that are executed within a single clock cycle.

17. The computer system of claim 15 wherein each request of said plurality of requests to access said data cache has a dedicated copy of tags that correspond to entries located in said data cache.

18. The computer system of claim 15 wherein said plurality of requests to access said data cache seek access to respective blocks.

19. The computer system of claim 15 wherein said plurality of requests to access said data cache seek to access different addresses of the same block in the same cycle.

20. The computer system of claim 15 wherein said plurality of blocks comprise respective parts of a level one data cache and contain cache line entries.

\* \* \* \* \*